(12) United States Patent
Pignatelli et al.

(10) Patent No.: US 11,256,564 B2
(45) Date of Patent: *Feb. 22, 2022

(54) MEDIA QUALITY AWARE ECC DECODING METHOD SELECTION TO REDUCE DATA ACCESS LATENCY

(71) Applicant: SK hynix Inc., Gyeonggi-do (KR)

(72) Inventors: David J Pignatelli, Saratoga, CA (US); Fan Zhang, Fremont, CA (US); Yu Cai, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,120

(22) Filed: Sep. 9, 2019

(65) Prior Publication Data
US 2020/0004626 A1  Jan. 2, 2020

Related U.S. Application Data

(63) Continuation of application No. 15/353,389, filed on Nov. 16, 2016, now Pat. No. 10,409,672.

(51) Int. Cl.
*G06F 11/00* (2006.01)
*G06F 11/10* (2006.01)

(52) U.S. Cl.
CPC .................. *G06F 11/1012* (2013.01)

(58) Field of Classification Search
CPC ................................................... G06F 11/1012
See application file for complete search history.

(56) References Cited

U.S. PATENT DOCUMENTS

| 7,657,703 B1* | 2/2010 | Singh ................. H04L 45/7453 711/108 |
| 9,448,877 B2* | 9/2016 | Candelaria .......... G06F 11/0763 |
| 2009/0125790 A1* | 5/2009 | Iyer .................... G06F 11/1068 714/773 |
| 2014/0108879 A1* | 4/2014 | Hirth .................... H04L 25/063 714/751 |
| 2016/0028544 A1* | 1/2016 | Hyde .................... G06F 3/0637 380/44 |
| 2016/0112068 A1* | 4/2016 | Kim ................... H03M 13/1111 714/755 |
| 2016/0179615 A1* | 6/2016 | Lee ....................... G11C 29/021 714/764 |

FOREIGN PATENT DOCUMENTS

| CN | 103942154 A | 7/2014 |
| CN | 105122213 A | 12/2015 |
| CN | 105957553 A | 9/2016 |

* cited by examiner

*Primary Examiner* — Katherine Lin
(74) *Attorney, Agent, or Firm* — IP & T Group LLP

(57) ABSTRACT

A memory system and operating method thereof includes a semiconductor memory device, and a memory controller controlling actions of the memory device. The memory controller contains a processor executing instruction and programs stored in the memory controller, a memory characterizer characterizing the memory system, and generating an index decision table, an in-flight assessor assessing read command, and predicting a proposed error recovery action in accordance with the index decision table, and a selective decoder executing the proposed error recovery action.

11 Claims, 9 Drawing Sheets

MEDIA QUALITY AWARE ECC DECODING METHOD SELECTION TO REDUCE DATA ACCESS LATENCY

CROSS-REFERENCE TO RELATED APPLICATION

This application is a continuation of U.S. patent application Ser. No. 15/353,389 filed on Nov. 16, 2016. The disclosure of each of the foregoing applications is herein incorporated by reference in its entirety.

BACKGROUND

1. Field

Exemplary embodiments of the present disclosure relate to a memory system, and more particularly to a memory system having a media quality aware Error-Correcting Code (ECC) decoding selection and operating method thereof.

2. Description of the Related Art

The use of computer systems has been rapidly increased in the digital era. Due to this fact, the reliability of digital data storage, such as a memory system, is critical.

Electrical or magnetic interference inside the computer system can cause a single bit of memory cells of the memory system to spontaneously flip to the opposite state to cause errors and result in internal data corruption.

Bit errors of a memory system can be caused by degradation of internal NAND memory structures from previous repeated accesses. In this case, the NAND is wearing out and not getting high energy particle disturbance like a Synchronous Dynamic Random-Access Memory (SDRAM) type of memory.

The memory system, or storage devices having an ECC controller is a type of computer data storage that can detect and correct the most common kinds of the internal data corruption. The memory system having the ECC controller is used in most computers where data corruption cannot be tolerated under any circumstances.

Typically, the ECC controller maintains the memory system immune to single-bit errors, the data that is read from each word is always the same as the data that has been written to, even if one or more bits actually stored have been flipped to the wrong state. While the memory system having the ECC controller can detect and correct the errors, most non-ECC memory system cannot correct errors although some may support error detection but not correction.

Thus, there remains a need for a memory system having the ECC controller and the operating method thereof. In view of the ever-increasing need to improve performance and security, it is more and more critical that answers be found to these problems. Solutions to these problems have been long sought but prior developments have not taught or suggested any solutions and, thus, solutions to these problems have long eluded those skilled in the art.

SUMMARY

Embodiments of the present disclosure are directed to a memory system having an ECC controller and the operating method thereof capable of improving the performance and reliability of the memory system having the ECC controller.

An operating method of a memory system comprising: characterizing the memory system, and generating an index decision table; assessing read command, and predicting a proposed error recovery action in accordance with the index decision table; and executing the proposed error recovery action.

A memory system comprising: a memory device; and a semiconductor memory controller controlling actions of the memory device, containing a processor executing instruction and programs stored in the memory controller, a memory characterizer characterizing the memory system, and generating an index decision table, an in-flight assessor assessing read command, and predicting a proposed error recovery action in accordance with the index decision table, and a selective decoder executing the proposed error recovery action.

DETAILED DESCRIPTION

Figure 1:
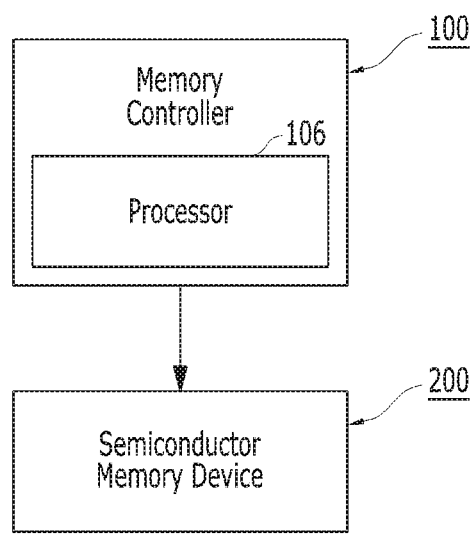
FIG. 1 is a top-level block diagram schematically illustrating a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various drawings and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying drawings that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A memory system, such as solid state drive (SSD), includes an ECC controller which typically operates in a "normal" mode until uncorrectable errors occur during reading of the media with a read command Once the uncorrectable errors occur, the ECC controller can operate in an "error recovery" mode. In the error recovery mode, several distinct steps can be involved to attempt to correct the errors uncorrectable in the normal mode. The distinct steps can be executed sequentially. The subsequent steps are more robust than the previous steps to attempt to correct the errors and supply intended data.

Referring now to FIG. 1, therein is shown a top-level block diagram schematically illustrating a memory system in accordance with an embodiment of the present invention. The memory system can include numerous components including a memory controller 100, such as a flash controller or ECC controller, and semiconductor memory devices 200, such as flash memory devices. The memory controller 100 can comprise a processor 106 for executing programs and instructions stored in the memory system for operating the memory system.

The memory controller 100 may control overall operations of the semiconductor memory devices 200, via a communication input/output (I/O) bus comprises command CMD, address ADDR, data DATA, power PWR, and a control signal CTRL. The control signal CTRL may include a command latch enable (CLE) signal, an address latch enable (ALE) signal, a chip enable (CE) signal, a write enable (WE) signal, a read enable (RE) signal, and so on.

The semiconductor memory devices 200 may perform one or more erase, program, and read operations under the control of the memory controller 100. The semiconductor memory devices 200 may receive the command, address, and data through input/output lines from the memory controller 100. The semiconductor memory devices 200 may receive the power PWR through a power line and the control signal CTRL through a control line.

The memory controller 100 and the semiconductor memory devices 200 may be integrated in a single semiconductor device, such as the solid state drive (SSD) or a memory card. When the ECC controller is used in the SSD, operation speed of a host (not shown) coupled to the memory system may remarkably improve.

The memory controller 100 and the semiconductor memory devices 200 may be integrated in a single semiconductor device such as a memory card. For example, the memory controller 100 and the semiconductor memory devices 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
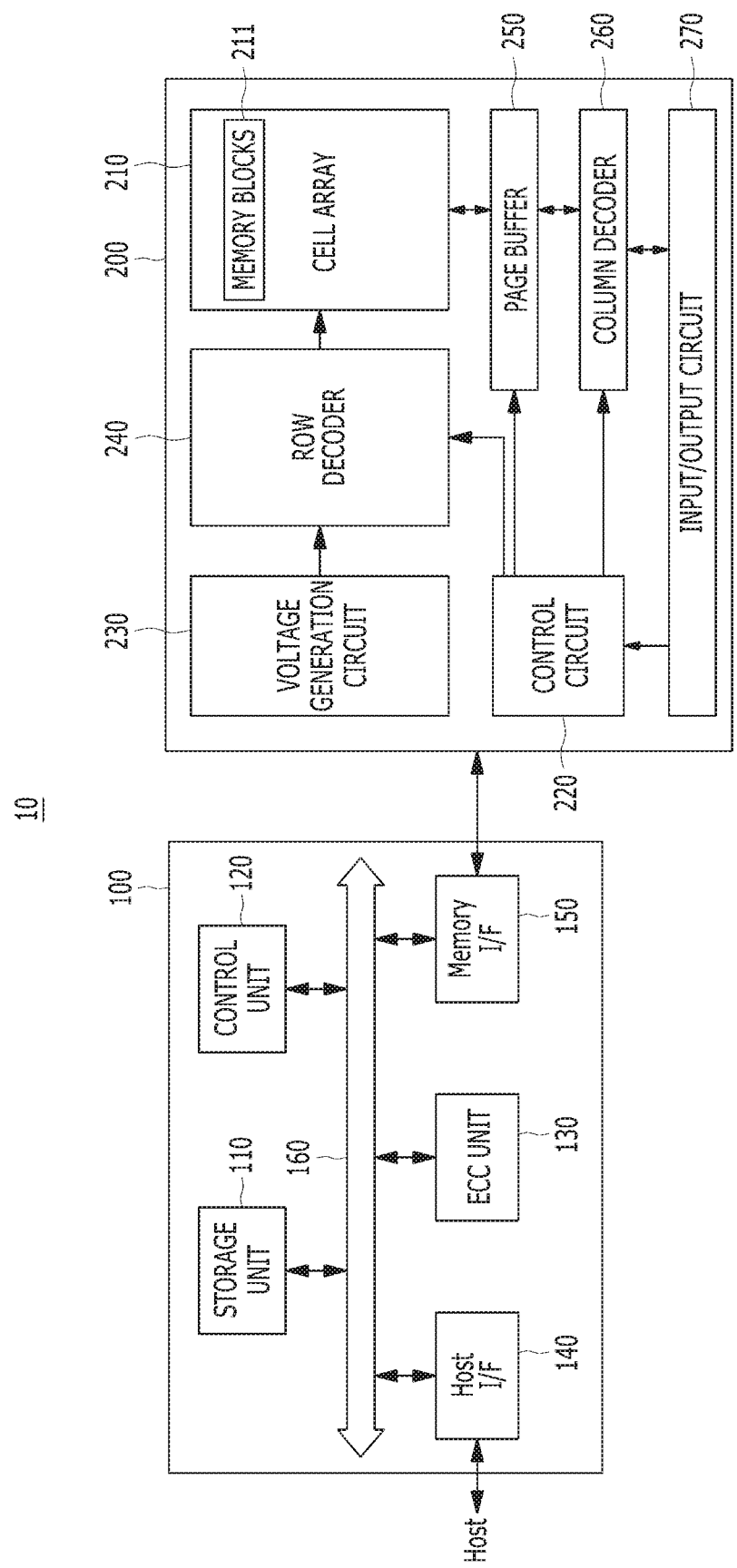
FIG. 2 is a detailed block diagram illustrating a Memory system in accordance with an embodiment of the present invention.

Referring now to FIG. 2, therein is shown a detailed block diagram illustrating a memory system in accordance with an embodiment of the present invention. For example, the memory system of FIG. 2 may depict the memory system shown in FIG. 1. The memory system may include the memory controller 100 and the semiconductor memory devices 200. The memory system may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The semiconductor memory devices 200 may store data to be accessed by the host device.

The semiconductor memory devices 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The memory controller 100 may control storage of data in the semiconductor memory devices 200. For example, the memory controller 100 may control the semiconductor memory devices 200 in response to a request from the host device. The memory controller 100 may provide the data read from the semiconductor memory devices 200, to the host device, and store the data provided from the host device into the semiconductor memory devices 200.

The memory controller 100 may include a storage unit 110, a control unit 120, the error correction code (ECC) unit 130, a host interface 140 and a memory interface 150, which are coupled through a bus 160.

The storage unit 110 may serve as a working memory of the memory system and the memory controller 100, and store data for driving the memory system and the memory controller 100. When the memory controller 100 controls operations of the semiconductor memory devices 200, the storage unit 110 may store data used by the memory controller 100 and the semiconductor memory devices 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the semiconductor memory devices 200 for the read and write operations. To store the data, the storage unit 110 may include a program memory, a data memory, a write buffer, a read buffer, a map buffer, and so forth.

The control unit 120 may control general operations of the memory system, and a write operation or a read operation for the semiconductor memory devices 200, in response to a write request or a read request from the host device. The control unit 120 may drive firmware, which is referred to as a flash translation layer (FTL), to control the general operations of the memory system. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the semiconductor memory devices 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low-density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the memory controller 100 and the semiconductor memory devices 200 to allow the memory controller 100 to control the semiconductor memory devices 200 in response to a request from the host device. The memory interface 150 may generate control signals for the semiconductor memory devices 200 and process data under the control of the CPU 120. When the semiconductor memory devices 200 is a flash memory such as a NAND flash memory, the memory interface 150 may generate control signals for the memory and process data under the control of the CPU 120.

The semiconductor memory devices 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may pre-charge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
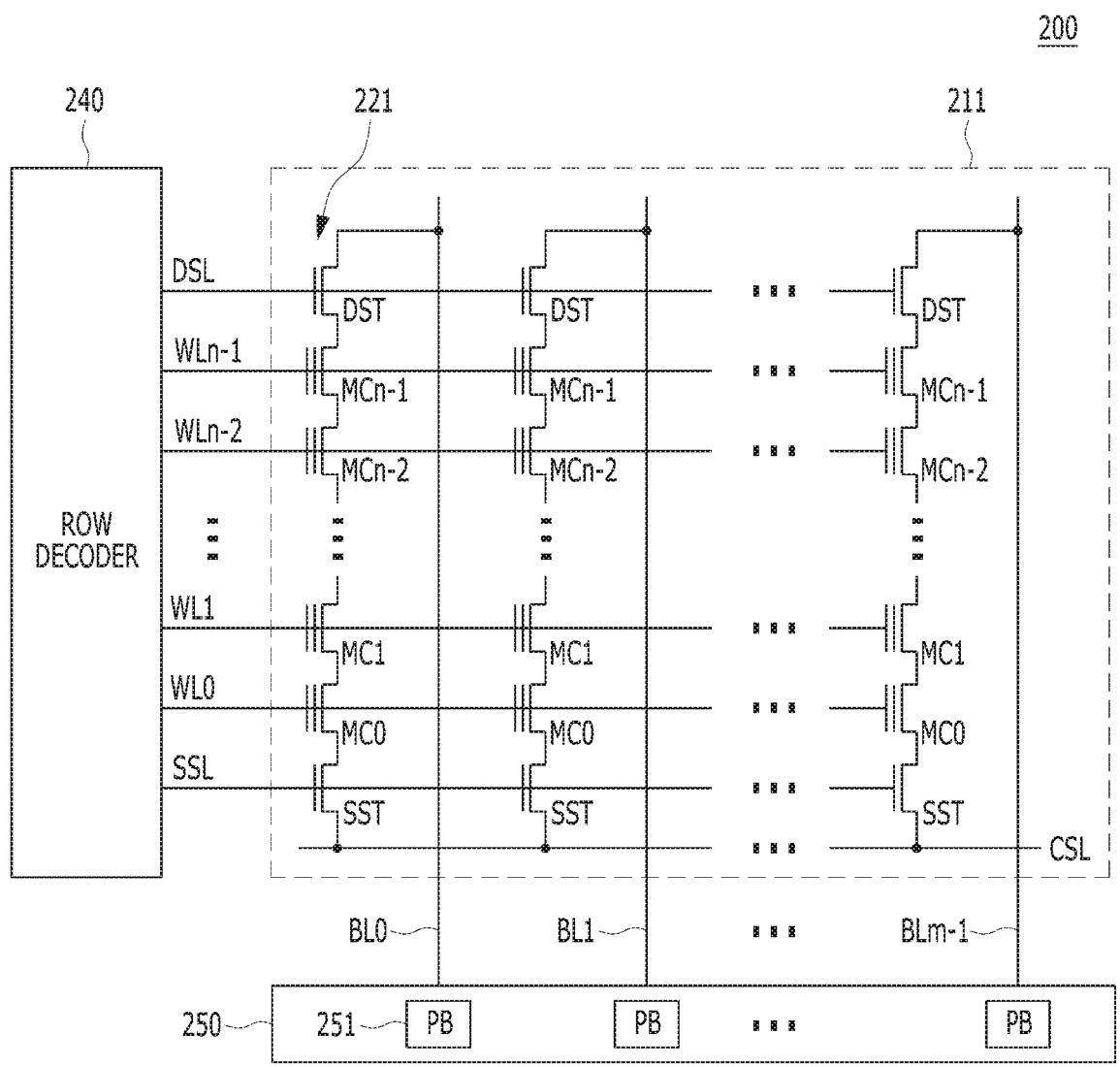
FIG. 3 is a circuit diagram illustrating a memory block of semiconductor memory devices in accordance with an embodiment of the present invention.

Referring now to FIG. 3, herein is shown a circuit diagram illustrating a memory block of semiconductor memory devices in accordance with an embodiment of the present invention. For example, a memory block of FIG. 3 may be the memory blocks 211 of the memory cell array 200 shown in FIG. 2.

The memory blocks 211 may include a plurality of cell strings 221 coupled to bit lines BL0 to BLm−1, respectively. The cell string of each column may include one or more drain selection transistors (DST) and one or more source selection transistors (SST). A plurality of memory cells or memory cell transistors may be serially coupled between the DSTs and SSTs. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Figure 4:
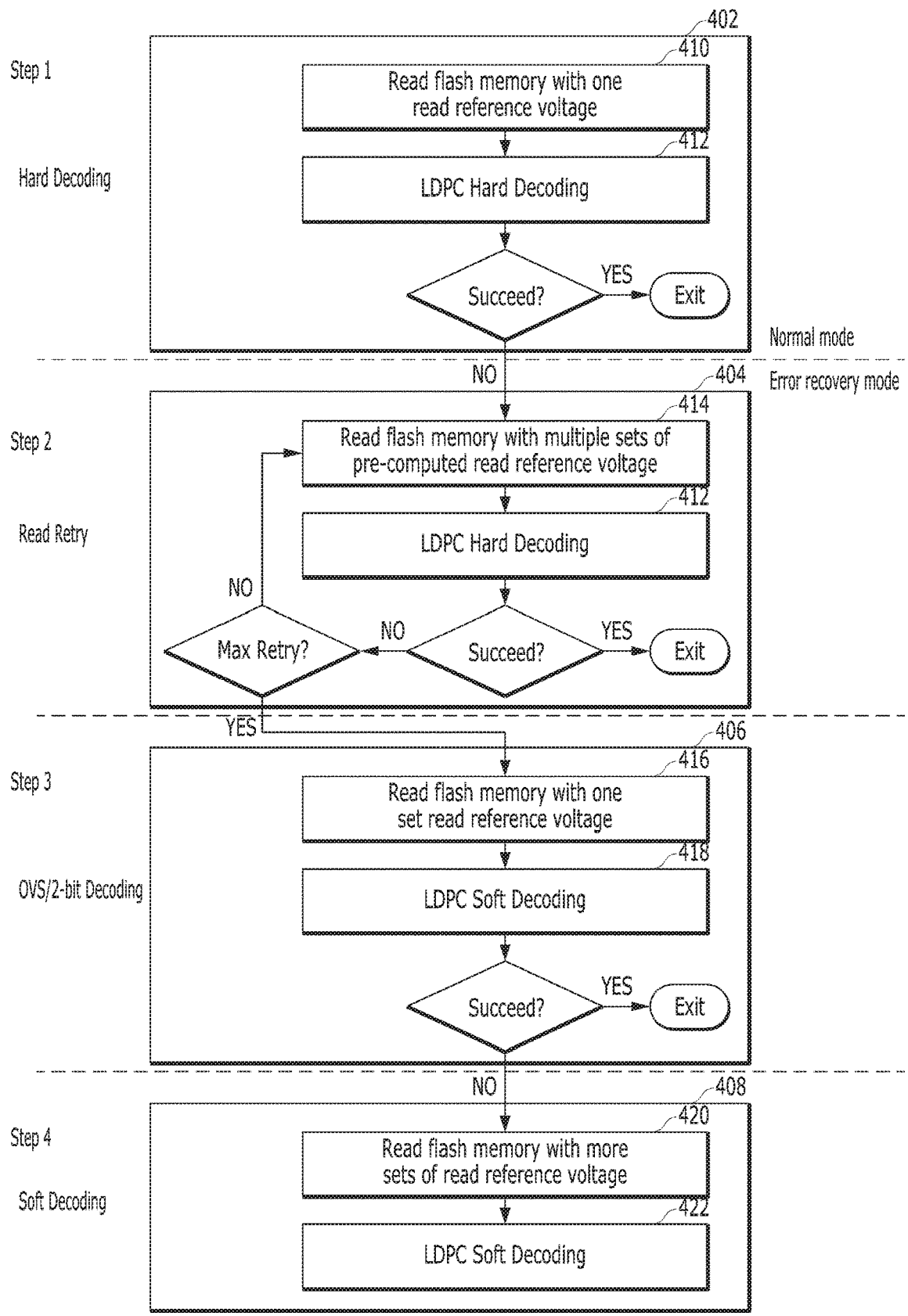
FIG. 4 schematically illustrates an error recovery process by the memory controller of a Memory system in accordance with an embodiment of the present invention.

Referring now to FIG. 4, therein is shown an error recovery process by the memory controller of the memory system in accordance with an embodiment of the present invention. The memory controller 100 of FIG. 1 can include a hard decoder 402, a read retry decoder 404, an oversampling (OVS) two-bit decoder 406, and a soft decoder 408. In the error recovery process, the hard decoder 402 can perform one-bit hard decoding in step 1, the read retry decoder 404 can perform read retry decoding in step 2, wherein the read retry decoding can include multiple iterations of the hard decoding with different read threshold settings, the OVS two-bit decoder 406 can perform OVS two-bit decoding in step 3, wherein the OVS two-bit decoding can be a type of partial soft decoding having a two-bit solution Log-Likelihood Ratio (LLR) estimate created and used in a LDPC soft decoder, and the soft decoder 408 can perform a soft decoding in step 4, wherein the soft decoding can be a full soft decoding using three or four bit LLR estimate inputs.

The error recovery process of the memory system can include the normal mode and the error recovery mode. When the error recovery process is at the normal mode, normal operation typically can use the step 1 of hard decision read or the hard decoding method attempting to correct errors. The hard decoder 402 can perform a read module 410 and a decoding module 412. The read module 410 can read the flash memory with one read reference voltage. The output of the read module 410 can be forwarded to the decoding module 412 for the LDPC hard decoding. If the LDPC hard decoding result is successful, the memory controller 100 can present the corrected data as the flash memory output data read therefrom. If the LDPC hard decoding is failed, the memory controller 100 can proceed to the step 2.

The hard decoding can include two forms, bit flip decoding and min-sum decoding.

In the bit flip decoding method provided in the embodiments of the present invention, only one bit is flipped according to a bit flipping rule, after the errors are detected. In the bit flip decoding method, the depth of the errors can be corrected is the lowest, but decoding time can be the fastest and power dissipation can be the lowest.

If the hard decoding is successful, the memory controller 100 can forward such error free data to the application requesting such data. If the hard decoding is failed, the memory controller 100 can begin the error recovery process in the error recovery mode.

In the min-sum decoding method, a message passing soft decoder utilized whereby the memory controller 100, can assign hard decoded input data a positive log-likelihood ratio (+LLR) value if a memory bit is read as 0, and a negative log-likelihood ratio (−LLR) value if the memory bit is read as 1. In this method, belief propagation is employed with all input samples having the same reliability. The belief propagation, also known as sum-product message passing, is a message passing algorithm for performing inference on graphical models. The belief propagation calculates the marginal distribution for each unobserved node, conditional on any observed nodes.

At the error recovery mode, the error recovery process can typically start with the step 2 of read retry decoding. In simplistic algorithm of the read retry decoding, a series of additional hard decoding operations can be attempted, but using adjusted read thresholds with each new media reading. The read retry decoder 404 can perform a multi-read module 414 and the decoding module 412. The multi-read module 414 can read the flash memory with multiple sets of pre-computed read reference voltage. The output of the multi-read module 414 can be forwarded to the decoding module for LDPC hard decoding. If the LDPC hard decoding result is successful, the memory controller 100 can present the corrected data as the flash memory output data read therefrom. When the LDPC hard decoding is failed, the memory controller 100 can go back to the multi-read module 414 for additional iteration, if the maximum retry number has not been reached. Once the maximum retry number has been reached and the LDPC hard decoding is failed, the memory controller 100 can proceed to the step 2.

The read thresholds of the read retry decoding can be pre-determined for each semiconductor memory device media and usually applied without any knowledge of the supporting conditions the read thresholds are created to correct. The number of attempted retries can be recommended to be a small number, such as five (5). If the read retry decoding attempts fail to recover the data, the error recovery process can attempt to decode using the OVS two-bit decoding.

The step 3 of the OVS two-bit decoding can effectively mark each hard detected bit with an erasure flag. The OVS two-bit decoder 406 can perform a read set module 416 and a two-bit decoding module 418. The read set module 416 can read the flash memory with one set read reference voltage. The output of the read module 416 can be forwarded to the two-bit decoding module 418 for the LDPC soft decoding. If the LDPC soft decoding result is successful, the memory controller 100 can present the corrected data as the flash memory output data read therefrom. If the LDPC soft decoding is failed, the memory controller 100 can proceed to the step 4.

The information of the hard detected bit with the erasure flag can greatly increase the error correction capability of the OVS two-bit decoder 406 with a relatively low additional media access overhead. The OVS two-bit decoder 406 can return two data vectors to the memory controller 100, hard detection data, such as the hard detected bit, and erasure information, such as the erasure flag. If the threshold voltage of a certain bit is sensed to be far away from the borderlines of two neighboring states, the bit can be assumed to be correct with high probability, and the value of the bit is strong indicating a strong bit. If the threshold voltage of the certain bit is sensed to be substantially close to the borderline of two neighboring states, the value of the bit is assumed to be weak with a lower probability that the bit is correct, indicating a weak bit.

For the strong bit, +LLRStrong or −LLRStrong can be assigned if the bit value is read as 0 or 1, respectively. For the weak bit, +LLRWeak and −LLRWeak can be assigned to the bit if the bit value is read as 0 or 1, respectively.

If the OVS two-bit decoding fails, the memory controller 100 can assign more reads to read semiconductor memory devices 200 of FIG. 1, and divide threshold voltage range of memory cells into more regions and assign more finite LLR values in the step 4 of the soft decoding.

The soft decoder 408 can perform a multi-set read module 420 and a soft decoding module 422. The multi-set read module 420 can read the flash memory with more sets read reference voltage. The output of the multi-set read module 420 can be forwarded to the soft decoding module 422 for the LDPC soft decoding. If the LDPC soft decoding result is successful, the memory controller 100 can present the corrected data as the flash memory output data read therefrom.

Whereas the hard decoding operates on a fixed set of possible values, typically 0 or 1 in a binary code, the inputs to the soft decoding may take on a whole range of values in-between 0 and 1. The extra information of the whole range of values in-between 0 and 1 can indicate the reliability of each input data point, and be used to form better estimates of the original data. Therefore, the soft decoding can typically perform better in the presence of corrupted data than the hard decoding counterpart.

When the semiconductor memory device media quality is low, error recovery latency can be high. The error recovery process may need to execute additional steps, including the step 1 to step 4, for correcting the errors. Because the four steps are executed sequentially, a latency penalty of the error recovery process flow can be significant in the case of all four steps are needed to be executed.

Even when the memory media quality is medium low, the read error recovery latency can still be relative high. The error recovery process may need to execute additional steps, including the step 1 to step 3, for correcting the errors. The latency penalty of the error recovery process flow can still be high in the case of three steps are needed to be executed.

For example, in the step 1, the hard decoder 402 attempts to correct the errors with the hard decoding method. If the step 1 fails, the error recovery process can go the step 2. If the read retry decoder 404 fails to correct the errors with the read retry decoding method, the error recovery process can move on to the step 3. If the OVS two-bit decoder 406 is successfully correct the errors, the error recovery latency is the combination of latencies of the step 1, step 2, and step 3, since the three steps are executed sequentially.

Figure 5A:
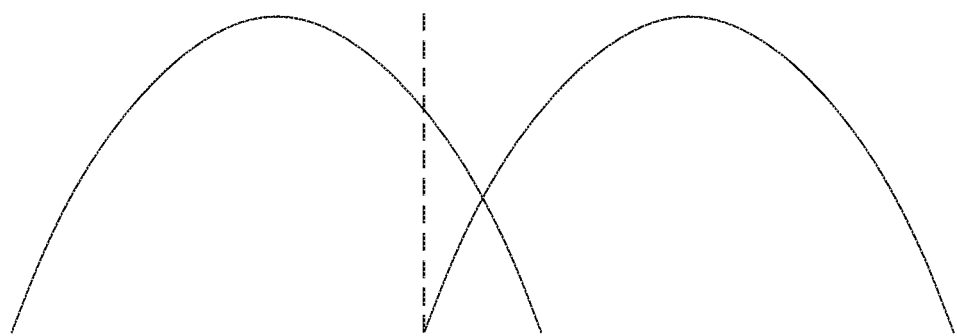
FIG. 5(A) is a diagram illustrating One-bit Hard Decoding read scheme of a Memory system in accordance with an embodiment of the present invention.

Referring now to FIG. 5(A), therein is shown a diagram illustrating One-bit Hard Decoding read scheme of a memory system in accordance with an embodiment of the present invention. The one-bit hard decoding scheme is utilized in the step 1 of the error recovery process of FIG. 4. In the one-bit hard decoding scheme, a single attempt of one-bit flipping can be executed.

Figure 5B:
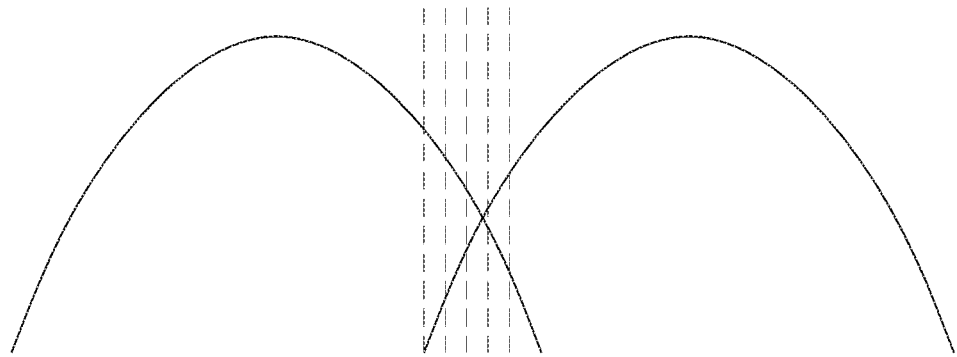
FIG. 5(B) is a diagram illustrating Read Retry read scheme of a Memory system in accordance with an embodiment of the present invention.

Referring now to FIG. 5(B), therein is shown a diagram illustrating read retry scheme of a memory system in accordance with an embodiment of the present invention. The read retry scheme is utilized in the step 2 of the error recovery process of FIG. 4.

In the read retry decoding, multiple attempts of one-bit flipping can be executed, wherein the multiple attempts have a maximum limit, such as five attempts. The maximum limit can be pre-determined in accordance with the characteristics of the semiconductor memory devices 200 of FIG. 1. Since different semiconductor memory devices may have different features and unique characteristics, the pre-determined maximum limit can be varied accordingly.

Figure 5C:
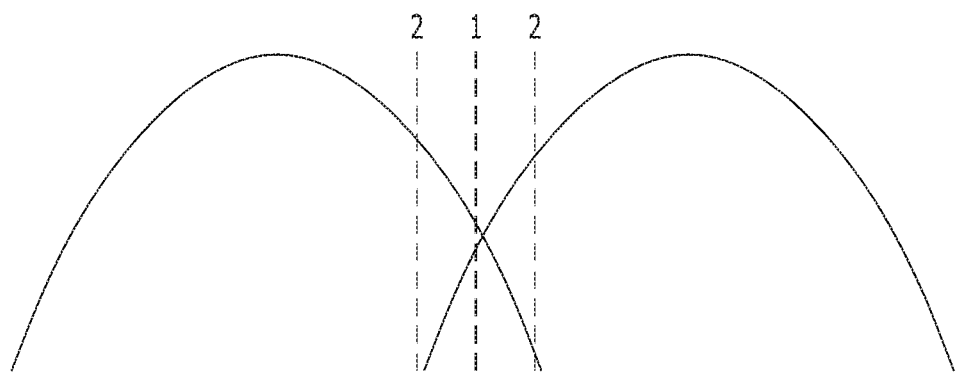
FIG. 5(C) is a diagram illustrating Two-bit Decoding read scheme of a Memory system in accordance with an embodiment of the present invention.

Referring now to FIG. 5(C), therein is shown a diagram illustrating OVS two-bit decoding scheme of a memory system in accordance with an embodiment of the present invention. The OVS two-bit decoding scheme is utilized in the step 3 of the error recover process of FIG. 4.

A target bit can be sensed and compared with adjacent states thereof. If the sensed value of the target bit is far away from borderlines of two adjacent states, the target bit can be a strong bit assumed to be correct with high probability. If the sensed value of the target bit is close to the borderlines of two adjacent states, the target bit can be a weak bit assumed to be correct with low probability.

Figure 5D:
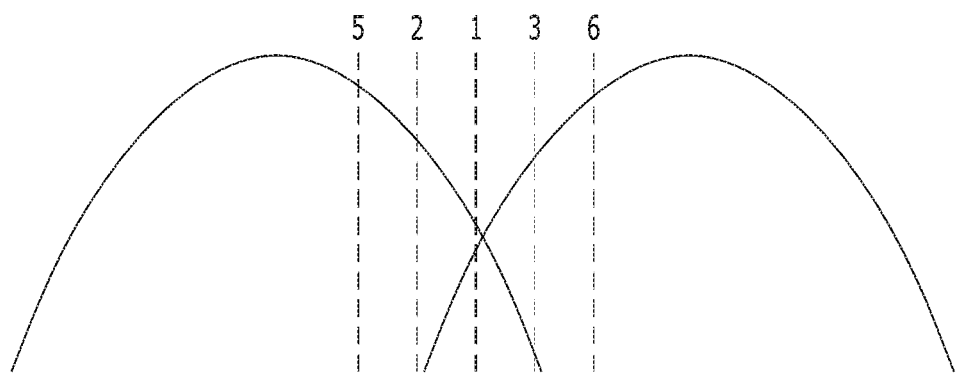
FIG. 5(D) is a diagram illustrating Soft Decoding read scheme of a Memory system in accordance with an embodiment of the present invention.

Referring now to FIG. 5(D), therein is shown a diagram illustrating soft decoding scheme of a memory system in accordance with an embodiment of the present invention. The soft decoding scheme is utilized in the step 4 of the error recovery process of FIG. 4.

If the OVS two-bit decoding fails, the memory controller 100 can assign more reads to read semiconductor memory devices 200, the threshold voltage range of the semiconductor memory cells can be divided into more regions and assign more finite LLR values in the step 4 of the soft decoding. The additional values from the additional divided ranges can better indicate the reliability of each input data point, and be used to form more accurate estimates of the original data.

The above decoding schemes can be utilized in the error recovery process sequentially. The subsequent decoding schemes can be more powerful, but costlier to operate than prior decoding schemes attempted for correcting the errors. The cost of operation can include higher power consumption, longer operation time, more complicated hardware to implement, or combination thereof. Therefore, the error recovery process can always attempt from the simplest decoding scheme, and move to the more powerful decoding scheme after the simpler one fails.

Figure 6:
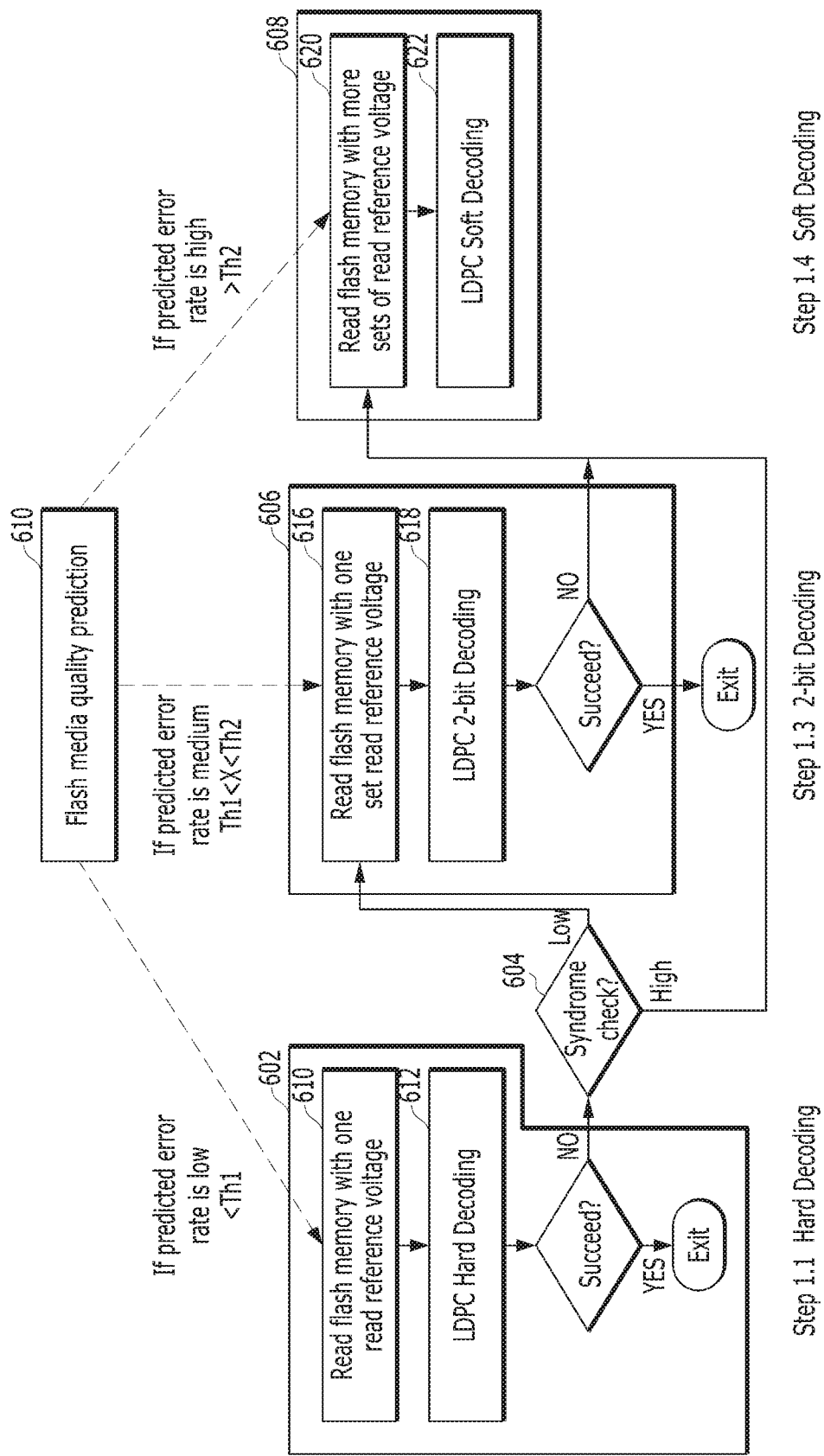
FIG. 6 is a block diagram schematically illustrating an improved error recovery process of a Memory system in accordance with an embodiment of the present invention.

Referring now to FIG. 6, therein is shown a block diagram schematically illustrating an improved error recovery process of a memory system in accordance with an embodiment of the present invention.

The improved error recovery process can include a hard decoder 602, a read retry decoder (not shown), a syndrome check component 604, an oversampling (OVS) two-bit decoder 606, a soft decoder 608, and a memory media quality prediction component 609. In the error recovery process, the memory media quality prediction component 609 can predict the error rate of a current read command, the hard decoder 602 can perform one-bit hard decoding in the step 1, the read retry decoder can perform read retry decoding in step 2, the OVS two-bit decoder 606 can perform OVS two-bit decoding in step 3, the soft decoder 608 can perform soft decoding in step 4.

The hard decoder 602 can perform a read module 610 and a decoding module 612. The read module 610 can read the flash memory with one read reference voltage. The output of the read module 610 can be forwarded to the decoding module 612 for the LDPC hard decoding. If the LDPC hard decoding result is successful, the memory controller 100 can present the corrected data as the flash memory output data read therefrom. If the LDPC hard decoding is failed, the memory controller 100 can proceed to the next step.

The syndrome check component 604 can collect syndrome error count when the LDPC decoding is failed. The collected syndrome error count can be organized as error/syndrome statistics and provided for deciding next course of error recovery action. When the error/syndrome statistics is low, the next course of error recovery action may be determined to the less robust action of OVS two-bit decoding. When the error/syndrome statistics is high, the next course of error recovery action may be determined to the more robust action of soft decoding.

The OVS two-bit decoder 606 can perform a read set module 616 and a two-bit decoding module 618. The read set module 616 can read the flash memory with one set read reference voltage. The output of the read module 616 can be forwarded to the two-bit decoding module 618 for the LDPC soft decoding. If the LDPC soft decoding result is successful, the memory controller 100 can present the corrected data as the flash memory output data read therefrom. If the LDPC soft decoding is failed, the memory controller 100 can proceed to the next step.

The soft decoder 608 can perform a multi-set read module 620 and a soft decoding module 622. The multi-set read module 620 can read the flash memory with more sets read reference voltage. The output of the multi-set read module 620 can be forwarded to the soft decoding module 622 for the LDPC soft decoding. If the LDPC soft decoding result is successful, the memory controller 100 can present the corrected data as the flash memory output data read therefrom.

A methodology of the memory system provided in the embodiments of the present invention can reduce the latency of the error recovery flow. The principal of the disclosure is predicting that the step 1, step 2, or step 3 may fail due to the low quality of the flash media, and therefore skip the steps predicted most likely to be failed. The best decoding option can be directly determined and triggered to eliminate the latency penalty of the previous attempts. Similarly, we can eliminate the penalty of step 1 and step 2, for the case that step 3 of the OVS two-bit decoding can correct the errors directly. Considerable latency can be saved if a proactive decoding strategy is chosen based on a prior knowledge for the media read.

In the reduced read latency methodology, a defense strategy can be utilized to minimize latency by skipping the most likely failures identified by all of the available prior information. For example, based on memory media characterization, that most significant bit (MSB) pages may demonstrate distinctly higher error rates than least significant bit (LSB) or center significant bit (CSB) pages in the same word line (WL). Further, due to memory media internal structures, certain WLs may return noisier read data than others. The combination of these two degradations can classify a higher than normal error probability. In the above descripted case, the hard decoding and the read retry decoding would likely fail to yield an error free result, but the OVS two-bit decoding could be implemented instead to correct the errors. The overhead of the single OVS two-bit decoding is certainly less than, the overhead of the single OVS two-bit decoding with the failed hard decoding and a single read retry decoding iteration.

In another example, the LSB page on a nominal WL can lead to select the simple hard decoding method since a lower error rate prediction. Similarly, if the LSB page selected with a long retention time can predict more likely to create many errors, the OVS two-bit decoding can be selected directly without iteration of prior failed attempts of the hard decoding and read retry decoding.

In another example, the MSB page is read on the worst WL with high Program Erase Count (PEC). In this very high error rate prediction case, the hard decoding, the read retry decoding, and the OVS two-bit decoding can be skipped, and the full soft decoding can be selected directly.

The memory media quality prediction component 609 can predict the error rate of the data to be read from the media, before the data is read, based on whether the data is on the page type that has high, medium or low error rate. The error rate prediction can also be based on the PEC correlation with the respective error rate, the retention time that the data is read, the read disturb count of the block being read, or the combination thereof.

Based on the error rate prediction from the memory media quality prediction component 609, if the data is predicted to have the high error rate, such as larger than threshold 2 (Th2), the memory controller 100 may select to decode using the soft decoding, and skip the hard decoding and OVS two-bit decoding. If the predicted error rate is medium, such as more than threshold 1 (Th1) but less than the Th2, the memory controller 100 may select the OVS two-bit decoding and skip the hard decoding. If the error rate prediction is low, such as less than the Th1, the hard decoding can be selected.

Noticeably in this scheme, if the weaker error recovery scheme is selected, and the decoding thereof fails, the stronger error recovery schemes can be automatically selected and no reliability loss compared to existing schemes. One important thing to note is that, even in the failed decoding attempt, the information can be collected and used effectively by the syndrome check component 604 to make smarter decisions for a further attempt.

Consider a case where hard decoding is the first choice but fails. The low-density parity-check (LDPC) decoder syndrome can give additional information of a data corruption level indication. The additional information can be used to select the next course of action in the same proactive manner as the first choice. For example, if the syndrome error count infers more errors than the OVS two-bit decoding method can reliably handle, the OVS two-bit decoding method can be skipped and the full soft decoding option can be chosen instead. Collections of the syndromes error counts can be organized to generate error/syndrome statistics.

Using the above methods, the latency for recovering data stored in degraded flash media can be reduced. Of course, all flash media are not created equally, and a closed loop system must be employed to learn the characteristics of the flash memory and to determine the different triggering thresholds. In this way, latencies can still be effectively reduced even when initial prediction of flash memory behavior is inaccurate and the first attempt is failed.

Figure 7:
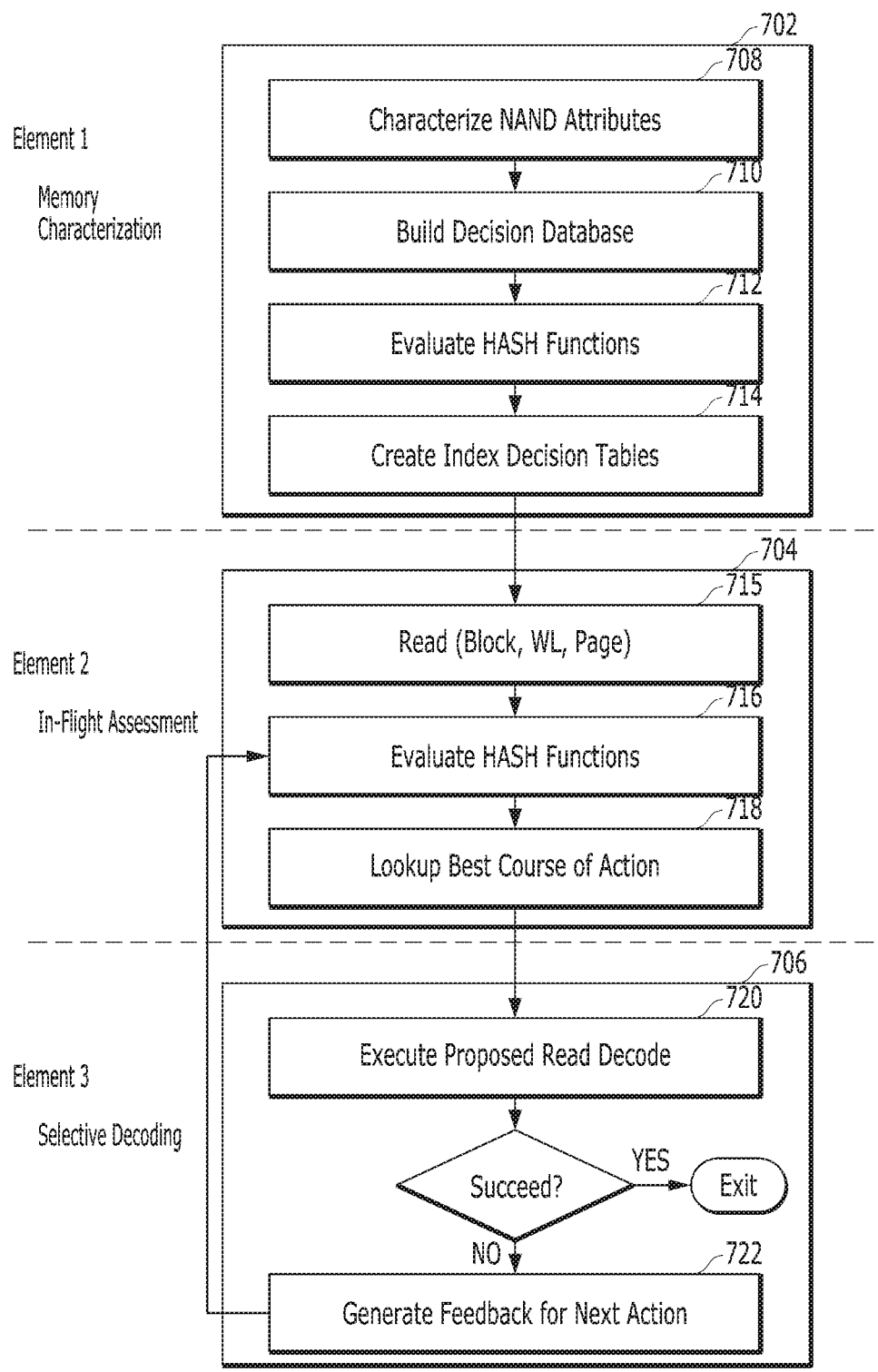
FIG. 7 a block diagram schematically illustrating an adaptive ECC decoding process of a Memory system in accordance with an embodiment of the present invention.

Referring now to FIG. 7, therein is shown a block diagram schematically illustrating an adaptive ECC decoding process of a memory system in accordance with an embodiment of the present invention. The adaptive ECC decoding process can include a memory characterizer 702, such as a NAND characterizer, an in-flight assessor 704, and a selective decoder 706.

There are two main types of the flash memory devices, NAND and NOR, named after the logic gates used in the flash memory devices, NAND gates and NOR gates, respectively. NAND type flash memory can be written and read in blocks or pages, wherein the blocks or pages are much smaller than the entire memory devices.

In the embodiments of the present invention, multiple distinct elements are provided in the improved error recovery process. The multiple distinct elements, such as NAND media characterization, in-flight media assessment, and preemptive data decoding or selective decoding, together can create a latency optimized error recovery process. The error recovery process can require at least all of the above three elements for a successful implementation.

The ability to optimize latency as described herein can be depended on the first essential element of a complete attributes characterization of the memory media, such as NAND media. The memory characterizer 702 can be utilized to perform memory characterization. The memory characterizer 702 can include an attributes characterizer 708, a decision database 710, an evaluator 712, and index decision tables 714.

The memory characterization process, can be designed to highlight conditions that produce various degrees of NAND media read errors. The NAND characterization process is not a canned set of expressions, as each NAND media variant can have attributes of differing importance relative to the reduction of the read latency. Brief description of the attributes and assessments thereof can be found in Table 1.

TABLE 1 values and description of the attributes

| Attribute | Values | Description |
| --- | --- | --- |
| PEC—program erase cycles/counts | 0 to max endurance (5K for example) | The primary wear indicator for NAND media. |
| NAND Page Type | LSB/MSB, [MLC] or LSB/CSB/MSB [TLC] | Each page exhibits slightly different error performance due to the number and placement of the thresholds. |
| Word Line Group | Varies depending on NAND construction | All WL are not created equal, Some exhibit more resistive loss simply due to distance from a switching point. |
| HTDR | Minutes, Days, weeks, months, year | The NAND media read error rate is a function of the time between writing the data and reading the data. 3D NAND has early retention shift measured over the first 10 minutes after programming. |
| Read Disturb | 0 to 150K | Exercising the NAND structure to perform reads degrades the signal quality of the other cells in the same block. Knowing the read disturb error characteristic we can predict read error levels based on a read counter for the accessed block. |
| Temperature or Temperature differential | 0 to 50 C. | Some of the previous attributes are impacted by temperature. Also, high error rates can exist when NAND is written at one temperature but then read at a different temperature. |

The attributes characterizer 708 can characterize the attributes of the memory system in accordance with the importance relative to the reduction of the read latency, as descripted in Table 1. The value of each attribute can be variable in accordance with the characterization result. For example, the value of the PEC attribute can be in a range of 0-5000. A higher PEC value may indicate higher program erase cycles, such as the memory cells are written and read more frequently. The frequently accessed memory cells may be more worn than other memory cells. Therefore, the higher PEC value can predict the higher error rate, and a more powerful decoding method, such as the soft decoding, may be suitable for the error recovery process. Each of the attributes, such as the PEC attribute can have a corresponding characterization result created by the attributes characterizer 708.

The characterization results of the attributes can be used to build the decision database 710. The decision database 710 can include all the characterization results in accordance with each of the attributes and the values thereof.

The evaluator 712 can calculate the hash value of each of the characterization results in the decision database 710 in accordance with a hashing algorithm. The hashing algorithm is a one-way hash function taking a variable-length input and producing a fixed-length output, known as a hash or hash value. The hash function ensures that, if the input information is changed in any way, the output can be produced entirely different. The inputs of the hashing algorithm can be the characterization results of the decision database 710.

The index decision tables 714 can be organized based on the hash values calculated by the evaluator 712. By looking up the index decision tables 714, the corresponding error correction action can be determined directly, instead of going through numerous iterations of attempts and failures. Therefore, the reduction of the read latency can be significant.

The second essential element, such as the in-flight assessor 704, can require that the memory controller 100 is capable of "in-flight" assessment. The in-flight assessor 704 can be utilized for determining how to interpret the database of knowledge illustrated by categories in the Table 1 based on the current read command for reading the memory media. Therefore, the firmware of the memory system can maintain status counters to track the attributes, such as PEC, SPRD, Program Time, and Temperature, for each NAND block of the memory devices. During the read command execution, the memory controller 100 can assess the attributes of the NAND Page Type and the WL group targeted by the read command.

The in-flight assessor 704 can perform a read module 715, a hush evaluator 716, and a lookup module 718. All of the attribute assessments of the read command read by the read module 715, can be hashed together in the hash evaluator 716 to produce an irreducible set of recommendations in an offline process. During the offline process, the hush evaluator 716 can calculate the hash of the current assessment and forward the hash to the lookup module 718. The results of the hash values can be collected into a hash result index in the lookup module 718. The hash result index can be used to retrieve the recommended course of action for decoders, such as "Skip hard decoding and read retry decoding, proceed with the OVS two-bit decoding", from the index decision table 714. The recommended course of action or the proposed error recovery action can be forwarded to the next step.

Finally, the third essential element is hardware implementation of the NAND media read ECC decoder or selective decoder 706. The selective decoder 706 can perform an execution module 720 and a feedback module 722. The execution module 720 can execute the proposed error recovery action. If the proposed error recovery action is successful, the memory controller 100 can present the corrected data as the flash memory output data read therefrom. If the proposed error recovery action is failed, the feedback module 722 can collect related information and feed back to the hash evaluator 716.

The hardware implementation of the selective decoder 706 can provide alternated sequences of the decoding attempts, with full access to the error/syndrome statistics of the prior attempts in FIG. 4. The error/syndrome statistics can be fed back into the "in-flight" assessment process to possibly change the next course of action. Also during the possible iterative process, the memory controller 100 can provide feedback into a decoding decision tree for deciding next course of action. The feedback would be exception clauses to produce the best outcome given that the prior choice is not correlated with expected behavior.

For example, the proposed course of action is hard decoding. When the proposed course of action is executed but failed, the memory controller 100 can recommend the next more robust error correction action automatically, such as the read retry decoding. However, with the feedback of the error/syndrome statistics, the memory controller 100 can change the next course of action to the soft decoding. The change of the next course of action can be due to the additional information of the error/syndrome statistics predicting a possible higher error rate than the read retry decoding can handle. Therefore, additional reduction of the read latency can be achieved, and the error correction process can be more intelligent.

The combination of the above three essential elements is critical since the final result can depend on the entire set of the three essential elements.

Another essential requirement is that the NAND media Read process described here can be proactive. In the proactive NAND media read process, the memory controller 100 can take an action before any error is detected. The use of hash function to create a unique, condensed set of deterministic outcomes from a broad range of different decision input attributes can be also critical. Typically, the memory controller 100 can look at PEC or SPRD, wherein the PEC and SPRD can be a wide array of inputs.

The above essential elements of the embodiments of the present invention comprise an error recovery process of the memory system. The benefits of the error recovery process of the embodiments of the present invention include, intelligently predicting error recovery action for correcting the errors of the memory system by evaluating success probability of the error recovery action and predicting an appropriate error recovery action. The apparatus and operating method of the memory system provided in the embodiments of the present invention can reduce read latency of the error recovery process, resulting in performance improvement of accuracy, lower power consumption, and faster access time.

Figure 8:
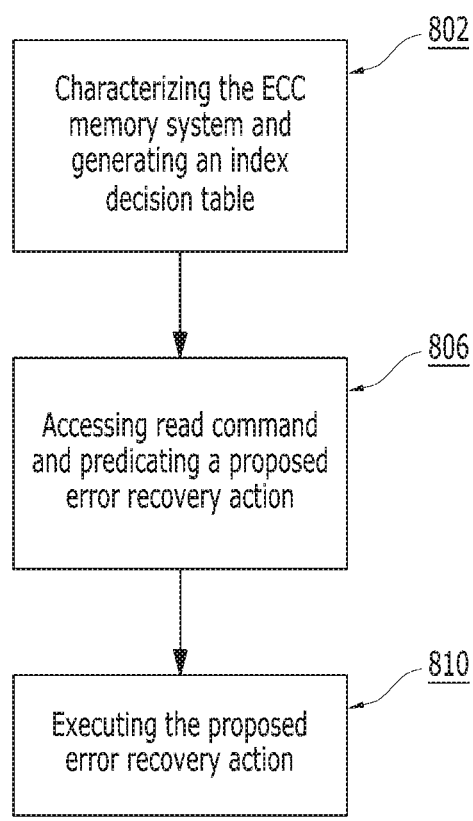
FIG. 8 is a flowchart illustrating operating method of a Memory system in a further embodiment of the present invention.

Referring now to FIG. 8, therein is shown a flowchart illustrating operating method of a memory system in accordance with a further embodiment of the present invention. The method can include: characterizing the memory system and generating an index decision table a block of 802; assessing read command and predicting a proposed error recovery action in accordance with the index decision table a block of 806; and executing the proposed error recovery action in a block of 810.

The above essential elements of the embodiments of the present invention comprise operating method of an error recovery process of the memory system. The benefits of the operating method of the error recovery process include, intelligently predicting error recovery action for correcting the errors of the memory system by evaluating success probability of the error recovery action and predicting an appropriate error recovery action. The apparatus and operating method of the memory system provided in the embodiments of the present invention can reduce read latency of the error recovery process, resulting in performance improvement of accuracy, lower power consumption, and faster access time.

Thus, it has been discovered that the memory system of the present invention furnishes important and heretofore unknown and unavailable solutions, capabilities, and functional aspects for error recovery of the memory system. The resulting method, process, apparatus, device, product, and/or system is straightforward, cost-effective, uncomplicated, highly versatile and effective, can be surprisingly and unobviously implemented by adapting known technologies, and are thus readily suited for efficiently and economically manufacturing integrated circuit packaging systems fully compatible with conventional manufacturing methods or processes and technologies.

Another important aspect of the present invention is that it valuably supports and services the historical trend of reducing costs, simplifying systems, and increasing performance. These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A memory system comprising:
    a semiconductor memory device having memory blocks configured to store data; and
    a memory controller configured to control the semiconductor memory device including:
        a memory characterizer configured to characterize the memory blocks based on attributes, and generate an index decision table based on the characterization of the memory blocks;
    an in-flight assessor configured to assess a read command from a host and determine an error recovery scheme in accordance with the index decision table related to a memory block corresponding to the assessment of the read command; and
    a selective decoder configured to decode the read data corresponding to the read command with the determined error recovery scheme, wherein the in-flight assessor selects a recovery action from among a plurality of recovery actions based on the characterization of the memory blocks and determines the selected recovery action as the error recovery scheme, each of the plurality of recovery actions including a different set of decoding schemes, wherein the in-flight assessor determines the error recovery scheme including one or more of one-bit hard decoding, read retry decoding, oversampling (OVS) two-bit decoding or soft decoding, and wherein the in-flight assessor determines the error recovery scheme including the plurality of error recovery actions, each of which includes for the different set the one or more of the one-bit hard decoding, the read retry decoding, the oversampling (OVS) two-bit decoding, and the soft decoding.

2. The memory system of claim 1, wherein the memory characterizer includes:

an attributes characterizer configured to characterize the attributes of the memory blocks, and generate a decision database based on characterization results of the memory blocks, an evaluator configured to generate the index decision table of the memory block in accordance with the decision database.

3. The memory system of claim 2, wherein the evaluator includes a hash evaluator configured to calculate hash values of all elements of the decision database in accordance with a hashing algorithm.

4. The memory system of claim 1, wherein the in-flight assessor provides threshold values to determine the error recovery scheme.

5. The memory system of claim 4, wherein the in-flight assessor determines the error recovery scheme in accordance with the threshold values, and a hash value of attributes of the read command and the semiconductor memory device.

6. The memory system of claim 1, wherein the in-flight assessor reads data from the semiconductor memory device in response to the read command, collects and evaluates attributes of the read command and the semiconductor memory device, and predicts an error rate of the read data.

7. The memory system of claim 1, wherein the one-bit hard decoding is the least robust, the read retry decoding is the second least robust, the oversampling (OVS) two-bit decoding is the second most robust, and the soft decoding is the most robust.

8. The memory system of claim 1, wherein the memory controller includes a syndrome check component configured to collect syndrome error count and create error/syndrome statistics when the determined error recovery scheme fails.

9. The memory system of claim 8, wherein the in-flight assessor determines a next error recovery scheme based on the error/syndrome statistics.

10. The memory system of claim 8, wherein the selective decoder is configured to decode the read data corresponding to the read command with the determined next error recovery scheme.

11. The memory system of claim 1, wherein the attributes include one or more of program erase count, page type, wordline group, read disturb and temperature.

* * * * *